(12) United States Patent
Kroener et al.

(10) Patent No.: US 10,379,811 B2
(45) Date of Patent: *Aug. 13, 2019

(54) NORMALIZATION OF A PRODUCT ON A DATAPATH

(71) Applicant: INTERNATIONAL BUSINESS MACHINES CORPORATION, Armonk, NY (US)

(72) Inventors: Klaus M. Kroener, Ehningen (DE); Cedric Lichtenau, Stuttgart (DE); Silvia M. Mueller, Altdorf (DE); Andreas Wagner, Boeblingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/815,120

(22) Filed: Nov. 16, 2017

(65) Prior Publication Data

US 2019/0018649 A1 Jan. 17, 2019

Related U.S. Application Data

(63) Continuation of application No. 15/651,646, filed on Jul. 17, 2017.

(51) Int. Cl.
*G06F 5/01* (2006.01)
*G06F 7/544* (2006.01)
*G06F 7/483* (2006.01)

(52) U.S. Cl.
CPC .............. *G06F 5/01* (2013.01); *G06F 7/483* (2013.01); *G06F 7/5443* (2013.01)

(58) Field of Classification Search
USPC .......................... 708/501, 503, 523, 627–632
See application file for complete search history.

(56) References Cited

U.S. PATENT DOCUMENTS

| | | |
|---|---|---|
| 8,606,840 B2 | 12/2013 | Ahmed |
| 8,990,282 B2 | 3/2015 | Lutz |
| 9,317,251 B2 | 4/2016 | Tsen et al. |
| 2015/0378678 A1 | 12/2015 | Dao et al. |
| 2016/0004507 A1 | 1/2016 | Elmer |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.
Sohn et al., "Improved Architectures for a Floating-Point Fused Dot Product Unit", Department of Electrical and Computer Engineering, The University of Texas at Austin, 2013, 8 pages.

*Primary Examiner* — Tan V Mai
(74) *Attorney, Agent, or Firm* — Heslin Rothenberg Farley & Mesiti P.C.; William A. Kinnaman, Jr.

(57) ABSTRACT

A unit operates on a sum term and a carry term separated into a high part and a low part of a product and performs a method that includes iteratively computing a carry save product and separating the carry save product into the high part and the low part: an intermediate product. The unit generates an intermediate wide result by performing a wide addition of the intermediate product to generate an unrounded sum for the high part (i.e., a fused-multiply-add high part) and the low part (i.e., a fused-multiply-add high part). The unit pre-aligns the intermediate wide result on two fixed length shifters such that the fused-multiply-add high part and the fused-multiply-add low part are pre-aligned to each fit on one shifter of the two fixed length shifters.

6 Claims, 9 Drawing Sheets

- FP-64b  
  A*B +C

A = + x1.8000 0000 0001 F * 2^40  
  B = + x1.0000 0005 0000 0 * 2^50  
  C = - x1.8000 0007 8001 F * 2^90

- Product: exact  
  rounded

P  = x1.8000 0007 8001 F000 0009 B000 00 * 2^90  
  Pr = x1.8000 0007 8001 F * 2^90    -- round down  
      x1.8000 0007 8002 0 * 2^90    -- round up

- P+C  
  exact rounded

A*B + C = x0.0000 0000 0000 0000 0009 B000 * 2^90  
      = x1.36 * 2^13 = 9920

Pr - C = 0                          -- round down  
      = 1.0 * 2^38 ≈ 2.7 e11    -- round up

FIG. 1

NORMALIZATION OF A PRODUCT ON A DATAPATH

BACKGROUND

The present invention relates in general to data processing systems, in particular, to a unit, method, system and computer program product for performing fused-multiply-add floating-point operations on 128 bit wide operands.

The IEEE-754-2008 Standard for Binary Floating Point Arithmetic, published in 2008, specifies a floating point data architecture that is commonly implemented in computer hardware, such as floating point processors having multipliers. The format consists of a sign, an unsigned biased exponent, and a significand. The sign bit is a single bit and is represented by an "S". The unsigned biased exponent, represented by an "e", is for example, 8 bits long for single precision, 11 bits long for double precision and 15 bits long for quadruple precision. The significand is, for instance, 24 bits long for single precision, 53 bits long for double precision and 113 bits long for quadruple precision. As defined by the IEEE-754-2008 standard, the most significant bit of the significand, i.e. the so called implicit bit, is decoded out of the exponent bits.

To improve floating-point arithmetic processing most modern processors use a process called the fused-multiply-add (in the following abbreviated as FMA) process to combine a floating-point multiplication operation, e.g., A×B, and a floating point addition operation, e.g., +C, for execution as a single instruction, e.g., A×B+C, where A, B, C are operands of the multiplication product A×B and the sum of C and the product. By performing two operations in a single instruction, the FMA process reduces overall execution time. The FMA process also provides improved precision because rounding need only be performed after both the multiplication and addition operations are performed at full precision. For instance, there is only one rounding error instead of two.

Analytics applications, especially when running on large data amounts, are very compute intensive. Their main data types are binary floating-point. This includes commercially available analytics software like ILOG, SPSS, Cognos, Algo, and many specialized analytics packages for the insurance and banking sectors.

Many mobile applications require location detection routines, which also are floating-point intensive calculations. Performance of these routines are key in emerging sectors like telematics, which combines mobile input with database queries and insurance analytics codes and has real-time requirements.

With growing problem size, numerical sensitivities of the algorithms are magnified. That degrades the stability of the algorithms and reduces the speed of convergence. This is a well know effect in the high performance arena. The easiest way to address this issue is to switch the mathematically critical routines from double precision to quad precision floating-point (128 bit).

With Big Data Analytics, this numerical stability issue is also hitting the commercial space. For example, convergence issues for very large ILOG® installations and for client's risk assessment codes running on large data sets are noticed. ILOG is a registered trademark of International Business Machines Corporation, Armonk, N.Y., USA For that large ILOG® installations, 15-30% faster convergence is noticed when switching to 128 bit floating-point calculations.

By way of example, US 2016/0048374 A1 discloses techniques for emulating fused-multiply-add (FMA) operations via the use of assist instructions. According to the techniques of this disclosure, FMA operations are emulated via assist instructions such that existing hardware for performing unfused-multiply-add operations may be used to emulate fused-multiply-add operations without requiring other specialized hardware.

Emulating a fused-multiply-add operation for a first operand, a second operand, and a third operand includes determining, by at least one processor, an intermediate value based at least in part on multiplying a first operand with a second operand. Existing methods further include determining, by the at least one processor, at least one of an upper intermediate value or a lower intermediate value, wherein determining the upper intermediate value includes rounding, towards zero, the intermediate value by a specified number of bits, and wherein determining the lower intermediate value includes subtracting the intermediate value by the upper intermediate value. The method further includes determining, by the at least one processor, an upper value and a lower value based at least in part on adding a third operand to one of the upper intermediate value or the lower intermediate value. The method further includes determining, by the at least one processor, an emulated fused-multiply-add result for the first operand, the second operand, and the third operand by adding the upper value and the lower value.

U.S. Pat. No. 9,104,474 B2 discloses methods and circuits for energy efficient floating-point multiply and/or add operations. The embodiments provide energy-efficient variable-precision multiply and/or add operations while keeping track of how many mantissa bits of a floating-point number may be certain and/or provide an energy efficient floating-point multiplication that includes a replay of the multiplication when a lowest portion of a multiplication result could affect the final result.

The variable precision floating-point circuit uses real-time certainty tracking to provide run-time precision selection. The certainty tracking enables low-precision calculations, whose result may be uncertain, to be redone with higher precision if necessary. Because the certainty may be dependent upon the data, it is determined along with the numerical computations. The circuits keeping track of the certainty add minimal overhead, while the majority of calculations produce correct results with lower precisions.

The floating-point multiplication steps are performed by an N-bit by N-bit multiplier (N×N-bit multiplier) circuit including a parallelogram configured to set carries of a predetermined number of least significant bits of a multiplication product to zero for a multiplication operation, and a detection circuit to induce a replay of the multiplication operation by the multiplier to generate a full multiplication result if necessary.

The variable precision floating-point circuit determines the certainty of the result of a multiply add floating-point calculation in parallel with the floating-point calculation. The variable precision floating-point circuit uses the certainty of the inputs in combination with information from the computation, such as, binary digits that cancel, normalization shifts, and rounding, to perform a calculation of the certainty of the result. A variable precision floating point circuit includes a variable precision mantissa unit that supports multiple precisions, multiple exponent data paths that support a maximum parallelism at a lowest precision, and certainty calculation units that provide certainty bounds of the outputs.

On processors according to the state of the art as described above, 128 bit floating-point operations are emulated in software. The described methods are usually one to two orders of magnitude slower than a hardware implementation, which make them less attractive for Big Data Analytics.

SUMMARY

Shortcomings of the prior art are overcome and additional advantages are provided through the provision of a unit configured to operate on a sum term and a carry term separated into a high part and a low part of a product and configured to perform a method, the method comprising: iteratively computing a carry save product; separating the carry save product into the high part and the low part, wherein the high part and the low part comprise an intermediate product; generating an intermediate wide result by performing a wide addition of the intermediate product to generate an unrounded sum for the high part and the low part, wherein the unrounded sum for the high part comprises a fused-multiply-add high part and the unrounded sum for the low part comprise a fused-multiply-add low part; and pre-aligning the intermediate wide result on two fixed length shifters such that the fused-multiply-add high part and the fused-multiply-add low part each fit on one shifter of the two fixed length shifters.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 illustrates an example of a floating point (FP), the exact and rounded product, and the addition of the product and the rounded addend (P+C) and is an illustration of various aspects of some embodiments of the present invention;

DETAILED DESCRIPTION

Figure 2:
FIG. 2 illustrates an issue addressed by aspects of embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 12:
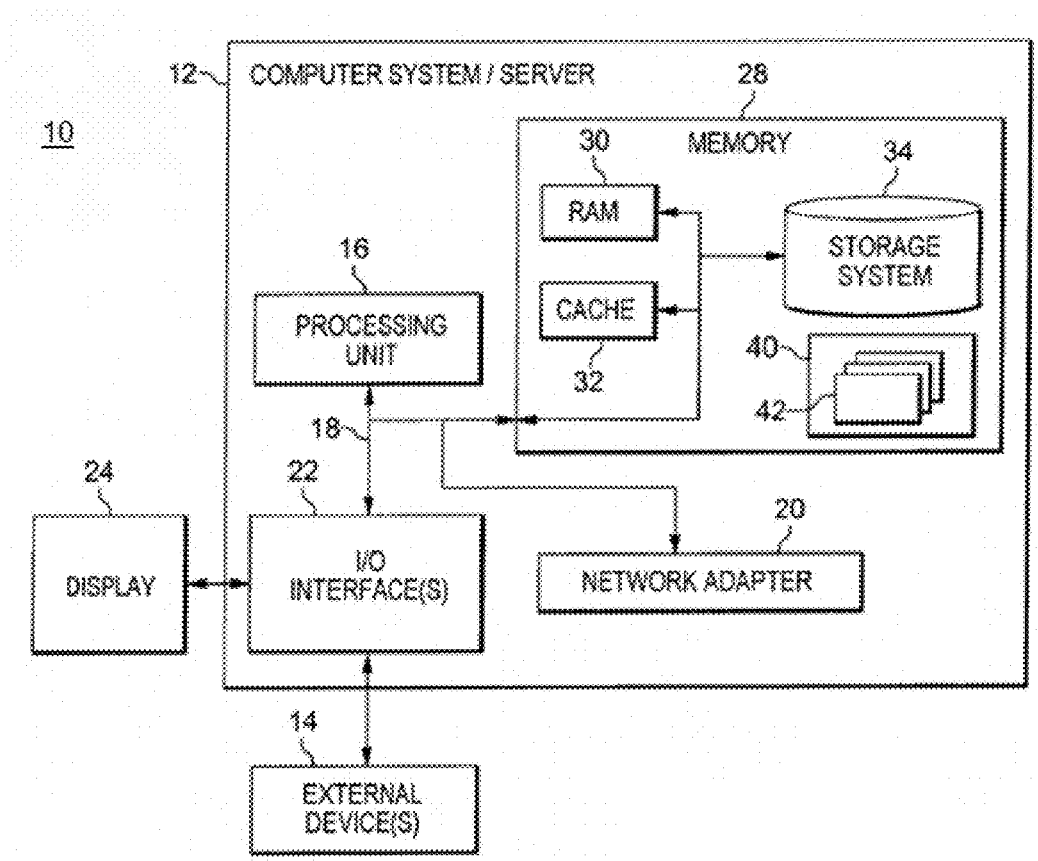
FIG. 12 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 12 as program/utility 40, having a set (at least one) of program modules 42, may be stored in memory 28.

In one or more aspects, a floating-point unit is provided, which is configured to implement a fused-multiply-add operation on three 128 bit wide operands. The floating-point unit includes: a 113×113-bit multiplier connected to the dataflow for multiplication operands and configured to compute a 226-bit-carry-save product iteratively, wherein a sum term and a carry term are separated into a high part and a low part of the product; a left shifter connected to the dataflow for a high part and a low part of an addend operand, configured to deliver an aligned part of the addend; a right shifter connected to the dataflow for the high part and a low part of the addend operand, configured to deliver the aligned part of the addend; a select circuit connected to the outputs of the shifters including a 3-to-2 compressor to combine the sum term and the carry term with the addend; an adder connected to the dataflow from the select circuit; a first feedback path connecting a carry output of the adder to the select circuit for performing a wide addition operation of the intermediate product and the aligned addend for the high parts and the low parts in two subsequent additions; and a second feedback path connecting the output of the adder to the shifters for passing an intermediate wide result through the shifters for normalization and a second pass through the adder for rounding, the second feedback path including circuitry to perform a fixed pre-alignment of the intermediate wide result. In some embodiments of the present invention, the fixed pre-alignment of the intermediate wide result is performed such that the high part and the low part have the same length such that the high part and the low part each fit on the shifters. In embodiments of the present invention, a pre-alignment of the high part and the low part is performed such that the parts fit on their respective shifters. The shifters, which are each of a fixed width (hence, the need to align the parts) can be of the same or of varying widths. In some embodiments of the present invention, the pre-alignment of the intermediate wide result is performed such that the high part and the low part fit in the existing shifter and leading zero anticipator (LZA) width.

Floating-point arithmetic is arithmetic using formulaic representation of real numbers as an approximation so as to support a trade-off between range and precision. A number is, in general, represented approximately to a fixed number of significant digits (the significand) and scaled using an exponent in some fixed base. The term floating point refers to the fact that a number's radix point (decimal point, or, more commonly in computers, binary point) can "float" (i.e., be placed anywhere relative to the significant digits of the number). This position is indicated as the exponent component, and thus the floating-point representation can be thought of as a kind of scientific notation. A floating-point system can be used to represent, with a fixed number of digits, numbers of different orders of magnitude: e.g., the distance between galaxies or the diameter of an atomic nucleus can be expressed with the same unit of length. The result of this dynamic range is that the numbers that can be represented are not uniformly spaced.

A floating-point unit (FPU, also referred to as a math coprocessor) is a part of a computer system specially designed to carry out operations on floating-point numbers. Floating point arithmetic functionality in computing remains important because given the demands of growing problem size, numerical sensitivities of the algorithms are magnified (e.g., with Big Data Analytics, this numerical stability issue is experienced in the commercial space). The continual magnification of values and problems degrades the stability of the algorithms and reduces the speed of convergence, even in multi-processor and multi-core systems. Speed degradation in arithmetic functions poses a particular challenge in computing when applied to the high performance arena, as the easiest way to address this issue is to switch the mathematically critical routines from double precision to quad precision floating-points (e.g., FP-128b, floating point 128-bit). As understood by one or skill in the art, quad precision floating point format provides 15 exponent bits and 113 mantissa bits.

As discussed earlier, one example of an application in which the an FPU is utilized and experiences challenges because of the demands of growing problem size is in zSystems, in the z/Architecture®, which may experience convergence issues for very large ILOG® installations when a given client's risk assessment codes are running on large data sets. z/Architecture is a registered trademark of International Business Machines Corporation, Armonk, N.Y., USA. One embodiment of the z/Architecture is described in "z/Architecture Principles of Operation," IBM Publication No. SA22-7832-10, March 2015, which is hereby incorporated herein by reference in its entirety. In this ILOG® installation, convergence can be improved (e.g., convergence can be 15-30% faster) when switching to FP-128b. However, utilizing a conventional design, including but not limited to an IBM® fused multiply-add FPU design, would be prohibitively expensive for quad precision. IBM® is a registered trademark of International Business Machines Corporation, Armonk, N.Y., USA.

Another possible approach to addressing demands of growing problem size is implementing an FMA, in which one or more processors approach arithmetic challenges by using floating-point data paths, which split a calculation in a big-addend and not-big-addend path (also known as far and near path). A value of an FMA is that one instruction performs two operations: a multiply operation and an add operation, thus achieving twice the throughput. However, the much higher value of the FMA is the enhanced accuracy of the combined operation: the addition is performed on the exact product and the exact addend. For 128 bit floating-point calculations the rounding effect can be more severe. Thus, switching to 128 bit floating-point calculations provides higher accuracy for an FMA, and is thus advantageous. Yet, the 128 bit FMA must have a decent performance as well, to make it attractive and usable for applications. Another issue with this approach is that an FMA, when used on a data flow, normalizes the wide sum of product and aligned addend. As understood by one of skill in the art, an addend is a number that is added to another number. In case of a not-big-addend path, the program code normalizes and rounds the sum. This means that the program code produced an intermediate result that needs to be normalized. Specifically FMA for FP128b provides double throughput in that it allows a processor to utilize one instruction to perform two operations, which enables enhanced accurency (e.g., adding the exact product and an addend). FIG. 1 provides an illustration of this approach. FIG. 1 illustrates an example of a floating point (FP), the exact and rounded product, and the addition of the product and the rounded addend (P+C).

Embodiments of the present invention provide a method, system, and computer program product that effectively merge and normalize a wide intermediate result (e.g., at least two times of the precision). Handling a wide intermediate product is an issue that is known in the art. As understood by one of skill in the art, in an FPU, an iterative multiplier generates a product, delivering it in two parts, a low order part and a high order part (also referred to herein as a low part and a high part). In general, the program code generates two parts: 1) the low order part, which is smaller than the target precision; and 2) a high order part to receive all the remaining bits, which is wider than the target precision. The iterative multiplier generally delivers the higher order part one iteration step after the low order part. In existing systems, these parts of the product are added/subtracted with the aligned addend, and the program code merges and normalizes the wide sum vector prior to rounding. It is an improved handling of these two parts in complex calculations that is addressed in embodiments of the present invention. Specifically, embodiments of the present invention introduce a pre-alignment of these parts that improves both the speed and accuracy with which the product is normalized.

Figure 3:
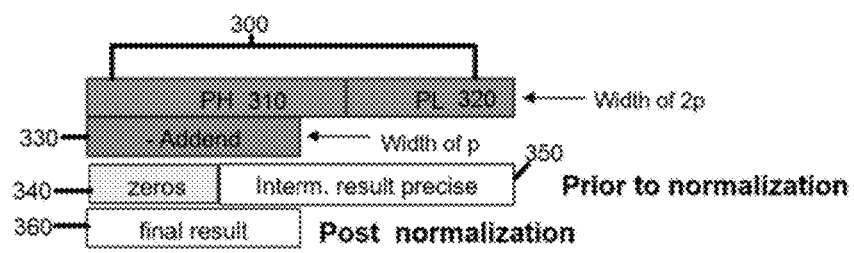
FIG. 3 illustrates an issue addressed by aspects of embodiments of the present invention.

Embodiments of the present invention provide a computer-implemented method, computer program product, and computer system for normalizing a wide product on a narrower shift and add datapath. FIGS. 2-3 illustrate the issue addressed by aspects of embodiments of the present invention.

Referring to FIG. 2, a multiplied intermediate result 200 has a width of 2p (p=precision of the operation). A default floating point add data flow has a width of p+guard+round+sticky+cout=p+4. The product, generated iteratively, is delivered in two halves, as discussed above, the low order part and the high order part. The width of the halves depends on the structure of the reduction tree. As illustrated in FIG. 2, the intermediate result 200, includes a high part of the product (PH 210), which has a higher width than the low part (PL 220). Thus, in order to fit the product into the target precision, one or more programs normalizes and rounds the values, which is in contradiction to an add/subtract operation, where the intermediate result should be either normalized or rounded.

FIG. 3 illustrates the intermediate result (e.g., intermediate result 200, FIG. 2) both before and after normalization (in order to fit the product into the target precision). As depicted in FIG. 3, this normalization, by one or more programs executing on one or more processors, includes a wide shifter, which is dependent on the leading zeros. These leading zeros can occur due to a product with at least 1 de-normal operand or in a FMA (floating point multiply add) by an effective subtract that cancels out some leading bits. As illustrated in FIG. 3, the width of the intermediate result 300 (e.g., 2p), includes the product high 310 and product low 320. The addend 330, with a width of p (precision of the operation) is subtracted. Prior to normalization, the result includes the aforementioned leading zeros 340 and the precise interim result 350. The final result 360, post normalization, is narrower than the intermediate result 300 such that the wide product in the intermediate result 300 was normalized on a narrower shift and add datapath.

Aspects of various embodiments provide advantages over current approaches to normalizing a wide product on a narrower shift and add datapath, by improving performance (and reducing the expense) and accuracy, when compared with existing methods. One existing method, utilizing an FMA pipe a with a 2x wide shifter is more expensive (in fact, prohibitively expensive in more complex situations). Another existing method, utilizing a complicated shift amount calculation to account for the aforementioned unequal split of the product high part and low part, is error prone, when compared with the reliability of aspects of the present invention. Another existing method, waiting for a multiplier result to be fully computed and performing equal splits for the high and low parts, is prohibitively slow and introduces an extra cycle into the method, when compared with aspects of the present invention.

Existing methods may take an FMA sum in its whole width and shift it one step to the correct rounding point. This approach requires a very wide shifter and a leading zero anticipator (LZA) which requires a large area and is therefore, prohibitively expensive.

Another existing solution is to perform sequential shifts on a high and a low part of the wide FMA sum, based on the leading zeros anticipation that was performed by an LZA. This approach can be problematic, though because the LZA is imprecise and the high part is too wide to fit on the add path. Thus, the calculation of the required shift amounts, as well as the determination if the parts need to be shifted left or right, complicates the method.

Figure 4:
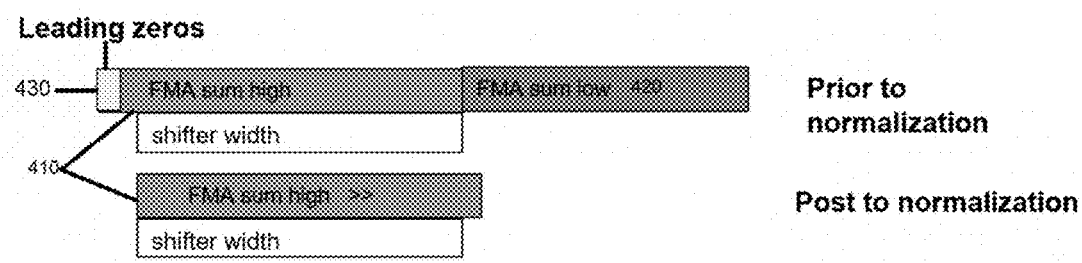
FIG. 4 illustrates a situation where the FMA high part is wider than the target precision.
Figure 5:
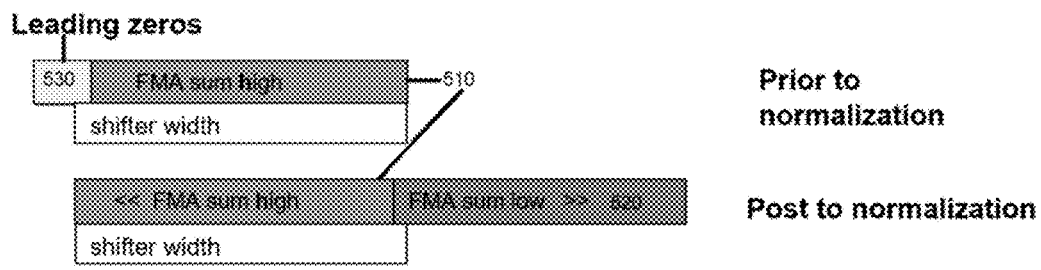
FIG. 5 illustrates a case where the effective FMA sum high is smaller than the target precision.
Figure 6:
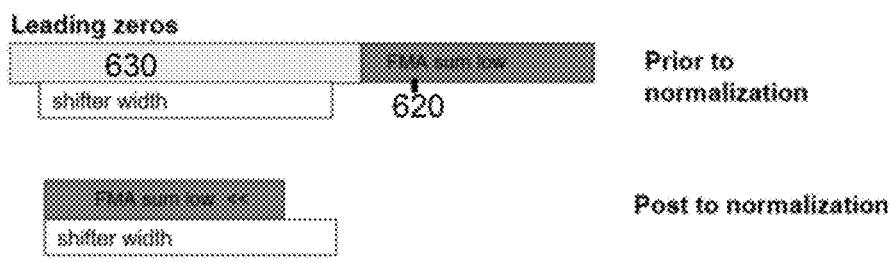
FIG. 6 illustrates a case where an FMA high part is zero.
Figure 11:
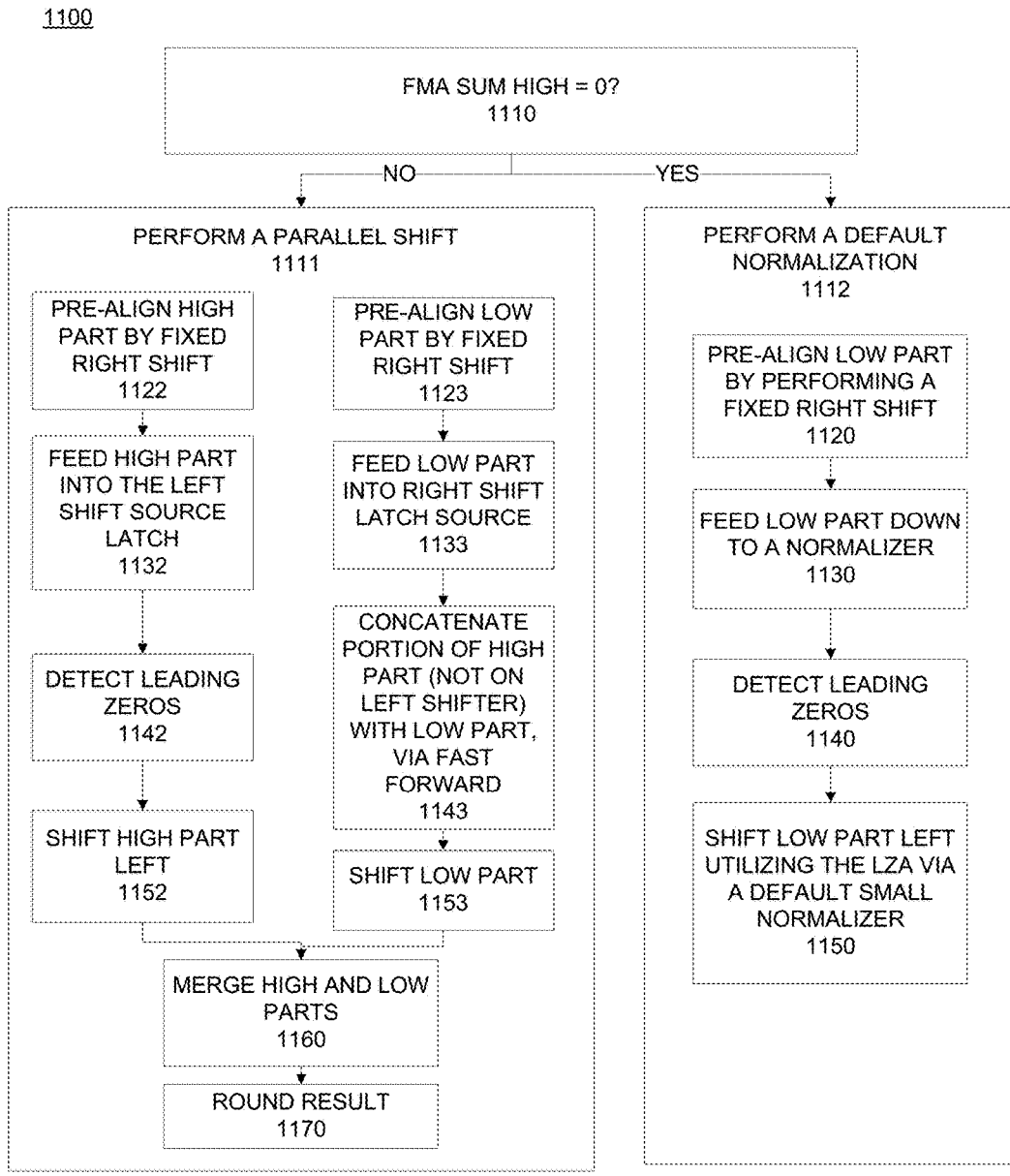
FIG. 11 is a workflow illustrating certain aspects of an embodiment of the present invention.

FIGS. 4-6 illustrate various cases where normalizing a wide product on a narrower shift and add datapath is desirable and illustrates shortcomings of existing methods of handling these particular cases. As is illustrated in FIG. 11, which will be discussed later, each of these cases can be processed utilizing aspects of embodiments of the present invention.

FIG. 4 illustrates a situation where the FMA high part 410 is wider than the target precision and thus, the FMA high part 410 is shifted and then rounded, the FMA high part 410 is shifted right, and the FMA low part 420 is shifted into sticky. The leading zeros are 430 are noted in FIG. 4.

FIG. 5 illustrates a case where the effective FMA sum high 510 is smaller than the target precision, and is merged with the FMA sum low 520. The FMA sum high 510 is shifted left and the FMA sum low is shifted right 520. The leading zeros are 530 are noted in FIG. 4.

FIG. 6 illustrates a case where an FMA high part is zero. As seen in FIG. 6, the effective FMA sum high is totally zero (and therefore not pictured) and FMA sum low 620 has also leading zeros 630, so the FMA sum low 620 is shifted left.

Handling the three cases of FIGS. 4-6 utilizing the existing methods described requires the program code to perform a separate shift amount calculation and case check to determine if the parts need a left shift or a right shift. An additional complication is the anticipation of the leading zero, which is imprecise and can be off by one, which can create accuracy issues. In contrast to existing methods, in embodiments of the present invention, a computer-implemented method, a computer program product, and a computer system include program code that provide normalization of a wide product on a narrower shift and add datapath by providing a pre-alignment of an intermediate result such that each part can fit on an existing shifter, limiting the shifting. In some embodiments of the present invention, because the shifters each have the same width, the fixed pre-alignment of the intermediate wide result is performed such that the high part and the low part have the same length such that the high part and the low part each fit on the shifters. In some embodiments of the present invention, the pre-alignment of the intermediate wide result is performed such that the high part and the low part fit in the existing shifter and leading zero anticipator (LZA) width. Aspects of embodiments of the present invention represent an improvement to computing by introducing a split path FPU design that executes normalization of a FMA wide sum, which, as illustrated in FIG. 2, includes a wider high part 210 and a smaller low part 220, with speed and reduced complexity, when one or more programs in an embodiment of the present invention performs a fixed pre-alignment of the two parts, so that both parts are shifted in one direction only, if they are part of the final result. Thus, the number of shifts is limited.

Figure 7:
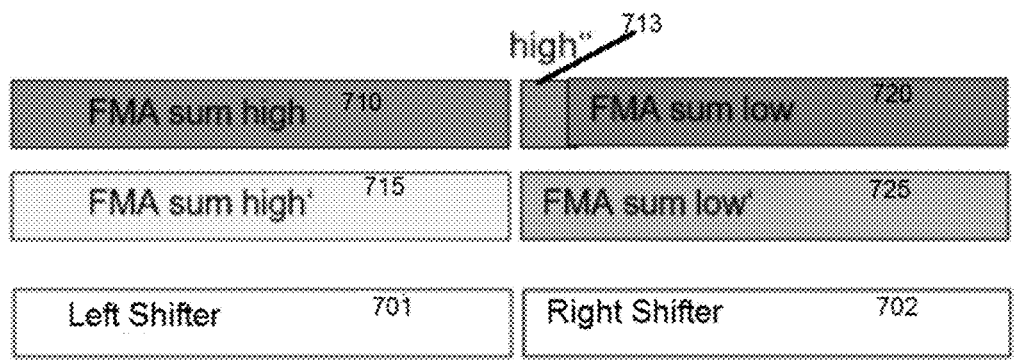
FIG. 7 illustrates certain aspects of some embodiments of the present invention.

FIG. 7 illustrates certain aspects of the present invention, and in particular, how one or more programs perform a pre-alignment (e.g., a fixed pre-alignment) of an FMA sum such that each part fits on the shifters 701-702. In this particular example, the shifters have the same width, so the pre-alignment is performed such that result has the same length on both parts. However, this shifter width is a non-limiting example. As seen in FIG. 7, before the shift, the FMA sum high 710 is wider than the FMA sum low 720. The length of FMA sum high 710 spans the left shifter 701 and a portion of the right shifter 702, where a remainder, high" 713, which does not fit on the length of the left shifter 701, combines with the FMA sum low 720 to fit the length of the right shifter 702.

Post normalization, in according with aspects of the present invention, the normalized FMA sum high (as represented by FMA sum high' 715) and the normalized FMA sum low (as represented by FMA sum low' 725), fit on the shifters, which, in this non-limiting example, are equal in width. The normalized FMA sum low, FMA sum low' 725, is comprised of the portion of the FMA sum high 710, high" 713, that did not fit on the left shifter 701.

Figure 8:
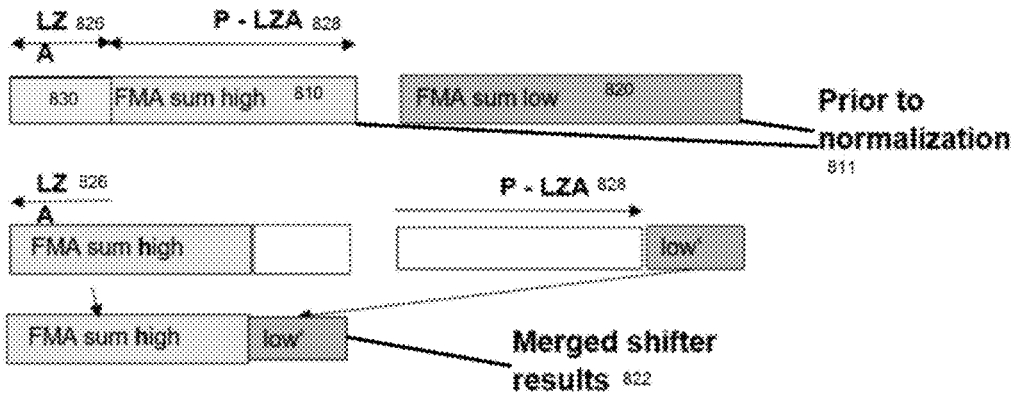
FIG. 8 illustrates certain aspects of some embodiments of the present invention.

FIG. 8 illustrates the pre-alignment and shifting of values in embodiments of the present invention. In FIG. 8, one or more programs can shift the FMA sum high 810 and the FMA sum low 820 in parallel, based on the data flow. Utilizing aspects of embodiments of the present invention can eliminate the need to do a right shift on the FMA sum high 810 because the effective FMA high sum does not overlay on the left. The one or more programs can normalize the FMA sum high 810 via the default add normalization because the FMA sum high 810 is shifted to the left.

FIG. 8 illustrates, in part, that the one or more programs, based on the data flow, can shift the high part 810 and the low part 820 in parallel. As illustrated in FIG. 8, the one or more programs utilize a left shifter 816 to shift the new FMA sum high 810 by LZA 818 to the left and a right shifter to shift the FMA sum low 820 to the right by the amount of by the difference of the target precision and the amount of leading zeros of the first portion of the fused-multiply-add high part, referred to as the Precision-LZA (P-LZA) 828. Then, the two parts are merged via a simple add. FIG. 8 displays the two parts prior to normalization 811, as well as the merged shifter results 822. The LZA 826 on the left identifies the leading zeros 830 in the FMA sum high 810.

When the new FMA sum high is all zeros, in some embodiments of the present invention, the one or more programs shift the sum low part to the left. The one or more programs detect this situation early such that the low part is fed back to the left shifter. As will be demonstrated in FIG. 11, early recognition of this condition eliminates the need for various processing aspects.

Figure 9:
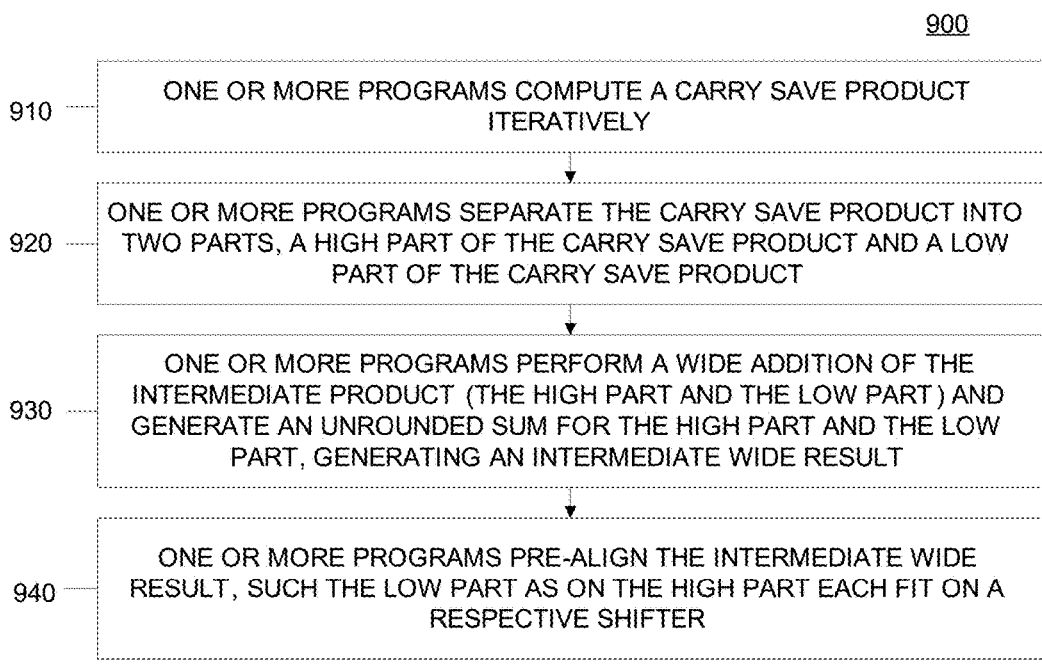
FIG. 9 is a workflow illustrating certain aspects of an embodiment of the present invention.

FIG. 9 is a workflow 900 illustrating a general overview of certain aspects of the FPU functionality in some embodiments of the present invention. In an embodiment of the present invention, one or more programs executed on an least one processing circuit compute a carry save product iteratively (910). The one or more programs separate the carry save product into two parts, a high part of the carry save product and a low part of the carry save product (920). The high part and the low part can be understood, collectively, as an intermediate product. The one or more programs perform a wide addition of the intermediate product (the high part and the low part) and generate an unrounded sum for the high part and the low part, generating an intermediate wide result (930). In some embodiments of the present invention, the one or more programs pre-align the intermediate wide result, such that both parts of the intermediate wide result, the low part as on the high part, each fit on a shifter (940). Thus, the pre-alignment may be fixed, based on the shifters, i.e., the width of the shifter may be determinative of the pre-alignment so that each part can fit on a respective fixed shifter. This pre-alignment may include utilizing the shifters to normalize the intermediate wide result rounding the intermediate wide result.

Figure 10:
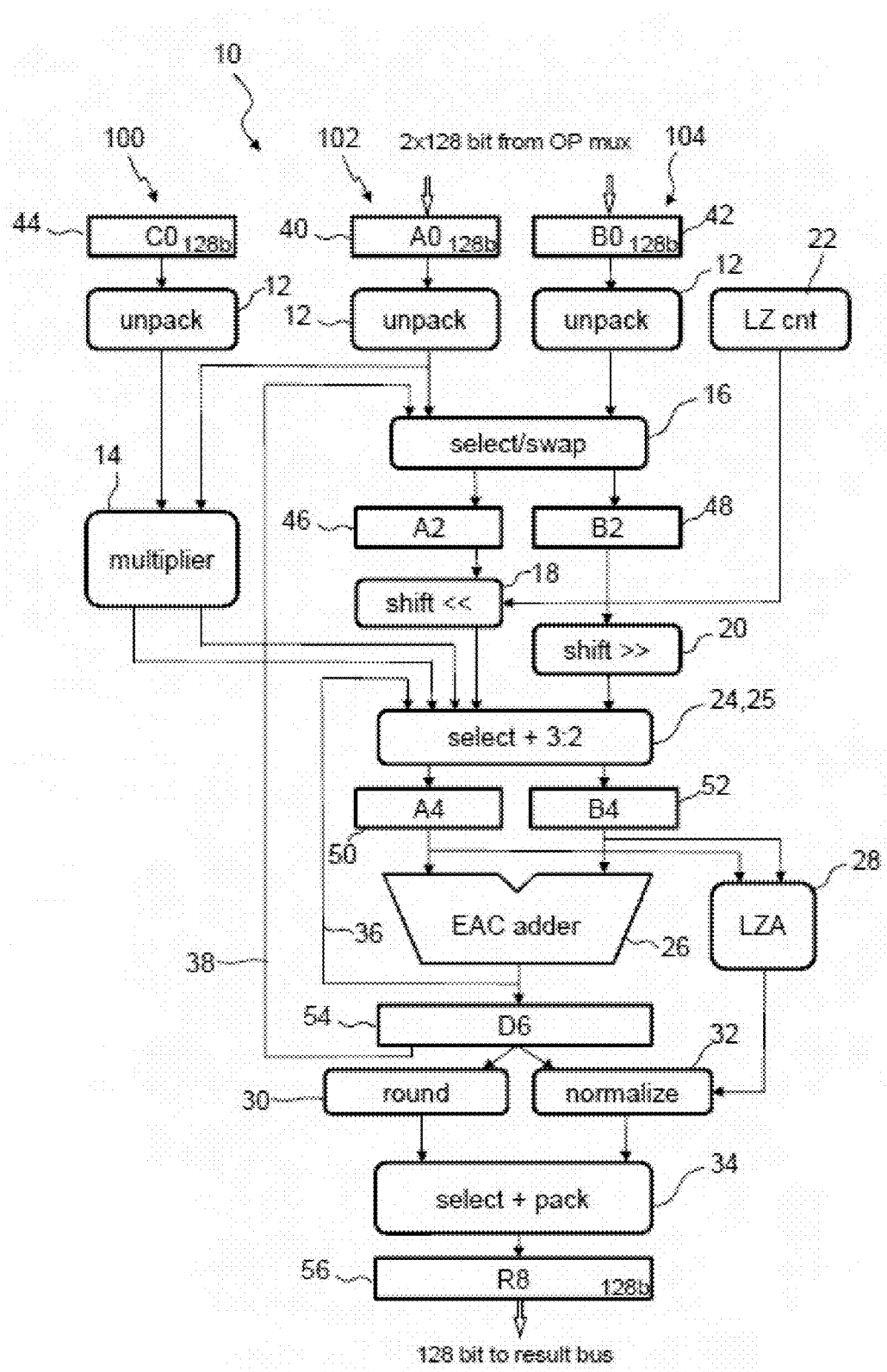
FIG. 10 depicts how aspects of embodiments of the present invention can be utilized in an existing data flow of an FPU to normalize a wide product on a narrower shift and add datapath.

FIG. 10 depicts how aspects of embodiments of the present invention can be utilized in an existing data flow of an FPU to normalize a wide product on a narrower shift and add datapath. For example, the pre-alignment of an intermediate results, which is illustrated in FIGS. 7-8, executed by one or more programs in some embodiments of the present invention is performed in the second feedback path 38, as described below. In general, FIG. 10 depicts a data flow of an FPU, where the floating-point unit 10 is configured to implement a fused-multiply-add operation on three 128 bit wide operands A (102), B (104), C (100) for an A×C+B operation. As aforementioned and illustrated in this figure, a 128-bit FMA may be executed on a conventional 128-bit floating-point unit with an add-based data flow with only moderate hardware extensions.

As depicted in FIG. 10, an FPU 10, includes a 113×113-bit multiplier 14 connected to the data flow for multiplication operands 100, 102 and configured to compute a 226-bit-carry-save product iteratively, wherein a sum term and a carry term are separated into a high part and a low part of the product.

FPU 10 also includes a left shifter 18 connected to the data flow, for a high part and a low part of the addend operand 104, configured to deliver an aligned part of the addend, and a right shifter 20 connected to the data flow for the high part and the low part of the addend operand 104, configured to deliver the aligned part of the addend. Further the FPU 10 includes a select circuit 24 connected to the outputs of the shifters 18, 20 including a 3-to-2 compressor 25 to combine the sum term and the carry term with the addend; and an adder 26 connected to the data flow from the select circuit 24. Additionally the FPU 10 includes a first feedback path 36 connecting a carry output of the adder 26 to the select circuit 24 for performing a wide addition operation of the intermediate product and the aligned addend for the high parts and the low parts, in two subsequent additions; and a second feedback path 38 connecting the output of the adder 26 to the shifters 18, 20 for passing an intermediate wide result 86 through the shifters 18, 20 for normalization and a second pass through the adder 26 for rounding. It is this second feedback path 38 that includes the fixed pre-alignment which characterizes the normalization of the wide product on a narrower shift and add datapath. One shifter 18 provides the functionality desired because data flow is such that the bigger operand is the first operand, according to one or more embodiments of the inventive method.

As discussed earlier, a 226-bit wide multiplier results as a product in a sum term and a carry term is separated into a low part and a high part to fit into the narrow 128-bit FPU adder 26. The low part and the high part are sent sequentially through the adder 26. The low part and the high part are merged and rounded or normalized to a final result.

Hardware extensions of the FPU 10, compared to a conventional 128-bit include the operand latch 44 and the unpack circuit 12 for the third operand 100, as well as the 113×113 multiplier 14 for getting the 226-bit carry save product sequentially in an iterative manner in a carry term and a sum term, separated into a high part and a low part of the product. Further the hardware extensions include the left shifter 18, connected to the A2 register 46. Alternatively, the right shifter 20 may be implemented with a bit rotating function and used in subsequent cycles. The select circuit 24 after the shifters 18, 20 is enhanced by a 3-to-2 compressor 25 to combine the two product terms, the sum term and the carry term with the addend. A further extension is the leading zero counter 22 connected to the unpack circuit 12 of the addend operand 104 (operand B in this embodiment). Further the first feedback path 36 around the adder 26, which is an end-around-carry adder, connecting a carry output 91 of the adder 26 to the select circuit 24, is provided additionally to implement a first feedback path 36 for performing a wide addition operation of the intermediate product and the aligned addend for the high parts and the low parts. Finally the second feedback path 38, connecting the output of the adder 26 to the shifters 18, 20 for passing an intermediate wide result 86 through the shifters 18, 20 for normalization and a second pass through the adder 26 for rounding is provided additionally.

The data flow, shown in FIG. 10, follows in general a top-down structure. The input operands 100, 102, 104 are latched into the input registers 44, 40, 42, followed by unpacking. The multiplication operands 100, 102 are fed to the multiplier 14. The product, calculated by the multiplier 14, is fed to the select circuit 24 including the 3-to-2 compressor 25, and then latched through the A4 register 50 and B4 register 52 into the adder 26. This is performed together with latching the addend operand 104 through the select/swap circuit 16 and the A2 register 46 and the B2 register 48, respectively, and optionally shifting by the shifters 18, 20, to the adder 26. Left shifting is dependent on results of the leading zero counter 22, calculating a number of leading zeroes of the addend 104. The leading zero counter 22 may particularly be used with denormal operands. Thus, normalization of a denormal operand is possible before continuing operating with the operand. The first feedback loop 36 starts by feeding the carry out 91 of the intermediate low result of the adder 26 back to the select circuit 24 with the 3-to-2 compressor 25. The result of the adder 26 is fed to the D6 register 54 in subsequent cycles, where the second feedback loop 38 starts, feeding data back to the select/swap circuit 16 for the next iteration. The second feedback path includes circuitry to perform a fixed pre-alignment of the intermediate wide result such that each part (of the high part and the low part) fits on the shifters 18 20. The circuitry performs a fixed pre-alignment of the intermediate wide result such that the high part and the low part fit on the available shifters. In cases where the shifters are of equivalent width, the circuitry performs a fixed pre-alignment of the intermediate wide result such that each part has the same length (i.e., each part fits on a fixed shifter and the shifters happen to be of the same width).

The result in the D6 register 54 is rounded by the round circuit 30 or normalized by the normalize circuit 32, respectively, depending on results of the leading zero anticipator 28. The final result may then be selected and packed in the select and pack unit 34 and latched into the R8 output register 56, feeding the data to a 128-bit result bus.

FIG. 11 is a workflow 1100 of an embodiment of the present invention, which illustrates aspects of a parallel shift 1111 and a default normalization 1112 executed by one or more programs (including hardware and/or software elements) in some embodiments of the present invention. In an embodiment of the present invention, the one or more programs determine if the FMA high part is zero (1110). This situation in which a high part is zero is illustrated in FIG. 6.

Returning to FIG. 11, if the high part is zero, the one or more programs perform a default normalization, including: pre-aligning the low part by performing a fixed right shift (1120), feeding the low part down to a normalizer (1130), detecting leading zeros with an LZA (e.g., a leading zero counter may be connected to the unpack circuit of the addend) (1140), and shifting the low part left utilizing the LZA via a default small normalizer (1150).

In embodiments of the present invention, an illustrated in FIG. 11, if the high part is not zero (1110), the one or more programs perform a shift of the high and low parts (1111). The shifts are illustrated as being performed in parallel, however, as understood by one of skill in the art, these actions can also be performed consecutively, provided that the results are eventually merged (1160). The aspects of these processes, when performed in parallel, can be synchronous and/or asynchronous.

Once the one or more programs determine that the FMA high part is not zero (1110), the one or more programs pre-align a portion of the high part that fits a narrower shift, thus, performing a right shift with a fixed portion of the high part, such that a fixed portion, which can be referred to as a first portion, of the high part remains on the shifter (1122). By performing this shift, what was formerly the high part is now comprised of the first portion of the high part, which is on the shifter, and a second portion of the high part, which does not fit after the fixed right shift. The one or more programs feed the first portion of the high part into the left shift source latch (1132). The LZA then detects leading zeros in the first portion of the high part (1142). Based on detecting the zeros, the one or more programs shift the first portion of the high part left (1152). In an embodiment of the present invention, the one or more programs perform this shift utilizing the amount of a leading zeros to perform the shifting. While the described actions (1122-1152) are performed on the high part, the low part is also pre-aligned and shifted in embodiments of the present invention.

Once the one or more programs determine that the FMA high part is not zero (1110), the one or more programs pre-align the low part by a fixed right shift (1123). The one or more programs feed the low part into the right shift source latch (1133) and concatenate the second portion of the high part remainder with the low part, via fast forward, creating a final low part (1143). The one or more programs shift the final low part utilizing the P-LZA (1153), the difference of the target precision and the amount of leading zeros of the first portion of the fused-multiply-add high part. The one or more programs then merge the first portion of the high part (which has been shifted to the left) and the final low part (1160). The one or more programs round the result of the merged values (1170).

In one or more aspects, a floating-point unit is provided, which is configured to implement a fused-multiply-add operation on three 128 bit wide operands. The floating-point unit includes: a 113×113-bit multiplier connected to the dataflow for multiplication operands and configured to compute a 226-bit-carry-save product iteratively, wherein a sum term and a carry term are separated into a high part and a low part of the product; a left shifter connected to the dataflow for a high part and a low part of an addend operand, configured to deliver an aligned part of the addend; a right shifter connected to the dataflow for the high part and a low part of the addend operand, configured to deliver the aligned part of the addend; a select circuit connected to the outputs of the shifters including a 3-to-2 compressor to combine the sum term and the carry term with the addend; an adder connected to the dataflow from the select circuit; a first feedback path connecting a carry output of the adder to the select circuit for performing a wide addition operation of the intermediate product and the aligned addend for the high parts and the low parts in two subsequent additions; and a second feedback path connecting the output of the adder to the shifters for passing an intermediate wide result through the shifters for normalization and a second pass through the adder for rounding, the second feedback path including circuitry to perform a fixed pre-alignment of the intermediate wide result to have specific lengths on the high part and the low part such that the high part and the low part each fit on the shifters. The fixed pre-alignment is discussed in detail in FIG. 11. The circuitry performs the alignments such that each part fits on a fixed width shifters, which may vary in width with respect to each other. In the circumstance where the shifters are of equivalent width, in some embodiments of the present invention, the circuitry performs a fixed pre-alignment of the intermediate wide result such that each part has the same length.

Embodiments of the present invention include a unit to operate on a sum term and a carry term separated into a high part and a low part of a product and a computer program product, and a method of normalizing a wide product on a narrower shift. In embodiments of the present invention, the circuitry, hardware instructions, and/or one or more programs (collectively referred to as one or more programs) iteratively compute a carry save product. The one or more programs separate the carry save product into the high part and the low part, where the high part and the low part comprise an intermediate product. The one or more programs generate an intermediate wide result by performing a wide addition of the intermediate product to generate an unrounded sum for the high part and the low part, where the unrounded sum for the high part comprises a fused-multiply-add high part and the unrounded sum for the low part comprise a fused-multiply-add low part. The one or more programs pre-align the intermediate wide result on two fixed length shifters such that the fused-multiply-add high part and the fused-multiply-add low part each fit on a respective one shifter of the two fixed length shifters.

In some embodiments of the present invention, the pre-aligning includes the one or more programs reducing a wider width of the fused-multiply-add high part or the fused-multiply-add low part. The pre-aligning may also include balancing a width of the fused-multiply-add high part or the fused-multiply-add low part to minimize a required width of the two fixed length shifters.

In some embodiments of the present invention, the two fixed length shifters are sum-addressed shifters.

In some embodiments of the present invention, the one or more programs also utilize the two fixed length shifters to normalize the intermediate wide result.

In some embodiments of the present invention, when pre-aligning, the one or more programs determine if the fused-multiply-add high part is zero. Based determining that the fused-multiply-add high part is zero, the one or more programs pre-align the intermediate wide result by performing a default normalization on the fused-multiply-add low part, where the normalized fused-multiply-add low part fits on one of the two fixed length shifters. In some embodiments of the present invention, performing the default normalization may include the one or more programs pre-aligning the fused-multiply-add low part by performing a fixed right shift, feeding the fused-multiply-add low part down to a normalizer, detecting leading zeros in the fused-multiply-add low part, and utilizing a number of leading zeros to shift the fused-multiply-add low part via a default small normalizer.

In some embodiments of the present invention, when pre-aligning, the one or more programs determine if the fused-multiply-add high part is zero. Based determining that the fused-multiply-add high part is not zero, the one or more programs perform parallel shifts of the fused-multiply-add high part and the fused-multiply-add low part. The one or more programs merge results of the parallel shifting to create a merged result, and the one or more programs round the merged result. In some of these embodiments, when performing the parallel shifts, the one or more programs pre-align the fused-multiply-add high part. To pre-align the fused-multiply-add high part, the one or more programs perform a fixed right shift, where a first portion of the fused-multiply-add high part fits on a first shifter of the two fixed length shifters and a second portion of the fused-multiply-add high part does not fit on the first shifter. The one or more programs feed the first portion fused-multiply-add high part into a left shift source latch. The one or more programs detect leading zeros in the first portion of the fused-multiply-add high part. The one or more programs shift the first portion of the fused-multiply-add high part left by a number of leading zeros of the first portion of the fused-multiply-add high part. The one or more programs also pre-align the fused-multiply-add low part, which includes the one or more programs pre-aligning the fused-multiply-add low part by performing fixed right shift. The one or more programs feed the fused-multiply-add low part into right shift source latch. The one or more programs concatenate the second portion of the fused-multiply-add high part with the fused-multiply-add low part, via fast forward, to generate a concatenated low part. The one or more programs shift the concatenated low part right.

In some embodiments of the present invention, when shifting the concatenated low part right, the one or more programs shift the concatenated low part by the difference of a target precision and the number of leading zeros of the first portion of the fused-multiply-add high part.

In some embodiments of the present invention, the one or more programs detect leading zeros in the first portion of the fused-multiply-add high part by utilizing a leading zero anticipator to perform the detecting. When shifting the first portion of the fused-multiply-add high part left, the one or more programs may utilize the number of leading zeros to perform the shifting.

In some embodiments of the present invention, the one or more programs pre-align the fused-multiply-add high part and the fused-multiply-add low part is asynchronously. In some embodiments of the present invention the one or more programs pre-align the fused-multiply-add high part and the fused-multiply-add low part is synchronously.

Referring now to FIG. 12, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the floating-point unit, which is configured to implement the fused-multiply-add operation, is a computing node, and can be understood as cloud computing node 10 (FIG. 12) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
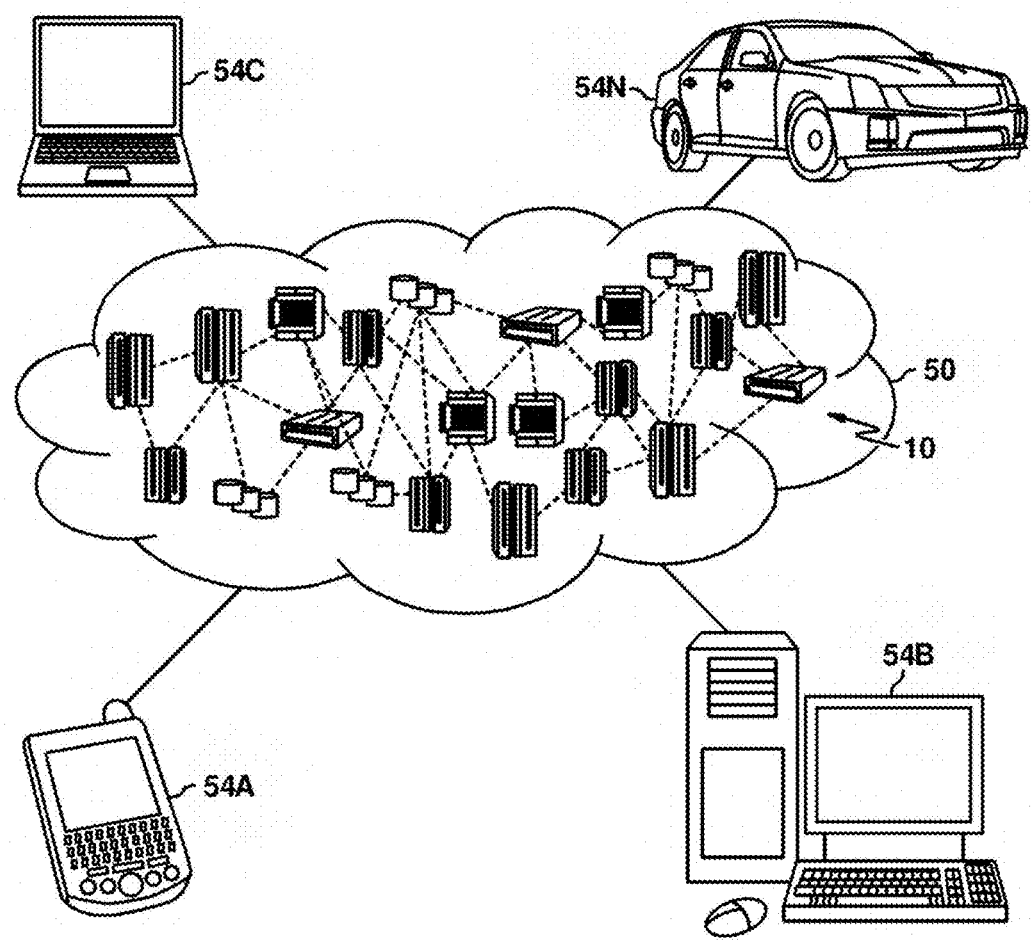
FIG. 13 depicts a cloud computing environment according to an embodiment of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
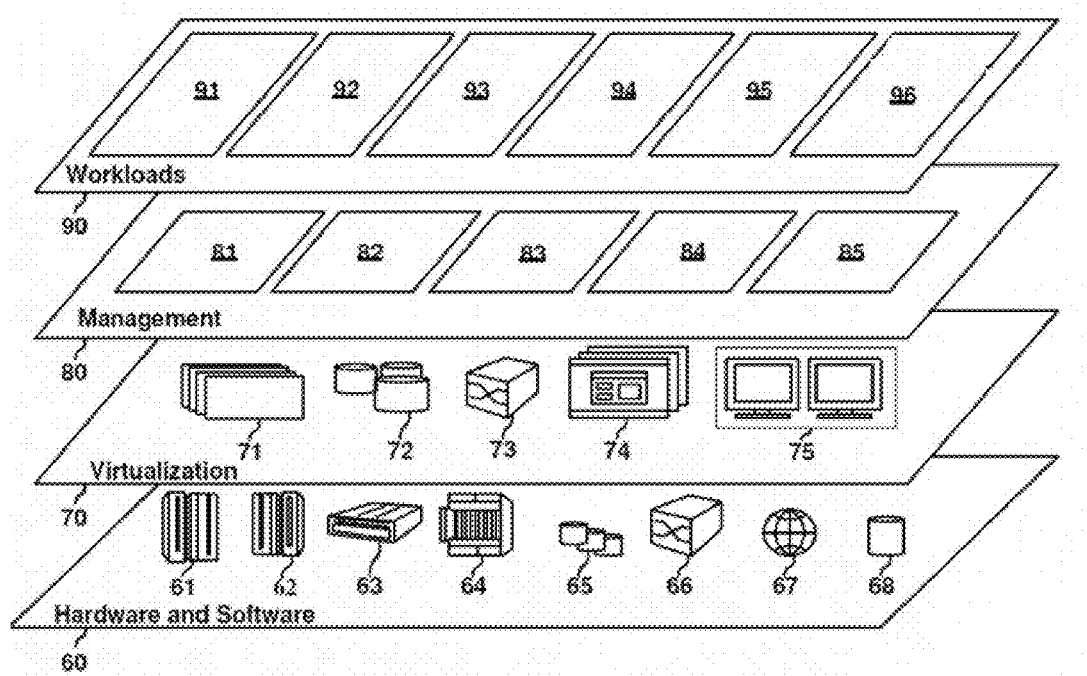
FIG. 14 depicts abstraction model layers according to an embodiment of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and implementing a fused-multiply-add operation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of normalizing a wide product on a narrower shift in a unit configured to operate on a sum term and a carry term separated into a high part and a low part of a product, the method comprising:
   iteratively computing a carry save product;
   separating the carry save product into the high part and the low part, wherein the high part and the low part comprise an intermediate product;
   generating an intermediate wide result by performing a wide addition of the intermediate product to generate an unrounded sum for the high part and the low part, wherein the unrounded sum for the high part comprises a fused-multiply-add high part and the unrounded sum for the low part comprises a fused-multiply-add low part; and
   pre-aligning the intermediate wide result on two fixed length shifters such that the fused-multiply-add high part and the fused-multiply-add low part each fit on a respective one shifter of the two fixed length shifters.

2. The method of claim 1, wherein the pre-aligning comprises balancing a width of the fused-multiply-add high part and a width of the fused-multiply-add low part to minimize a required width of the two fixed length shifters.

3. The method of claim 1, wherein the pre-aligning comprises reducing a wider width of the fused-multiply-add high part or the fused-multiply-add low part.

4. The method of claim 1, wherein the pre-aligning comprises:
   determining if the fused-multiply-add high part is zero; and
   based on determining that the fused-multiply-add high part is zero, pre-aligning the intermediate wide result by performing a default normalization on the fused-multiply-add low part, wherein the normalized fused-multiply-add low part fits on one of the two fixed length shifters.

5. The method of claim 4, wherein the performing a default normalization comprises:
   pre-aligning the fused-multiply-add low part by performing a fixed right shift;
   feeding the fused-multiply-add low part down to a normalizer;
   detecting leading zeros in the fused-multiply-add low part; and
   utilizing a number of leading zeros to shift the fused-multiply-add low part via a default small normalizer.

6. The method of claim 1, wherein the pre-aligning comprises:
   determining if the fused-multiply-add high part is zero; and
   based on determining that the fused-multiply-add high part is not zero:
      performing parallel shifts of the fused-multiply-add high part and the fused-multiply-add low part;
      merging results of the parallel shifting to create a merged result; and
      rounding the merged result.

* * * * *